3,023,251
PROCESS FOR PRODUCING AQUEOUS
TRIMETHYLOLPHENYL SOLUTIONS
Cal Y. Meyers, Princeton, N.J., assignor to Union Carbide Corporation, a corporation of New York
No Drawing. Filed Dec. 12, 1958, Ser. No. 779,834
13 Claims. (Cl. 260—621)

This invention relates to a process for producing aqueous trimethylolphenol solutions. More particularly, this invention relates to a process for producing aqueous solutions of trimethylolphenol from alkali and alkaline earth metal salts of trimethylolphenol by the use of cation exchanging materials.

As used herein, the term "trimethylolphenol" signifies the compound 2,4,6-trimethylolphenol, which compound may be represented by the graphic formula

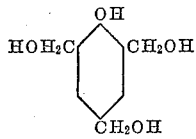

Trimethylolphenol is a useful water-soluble, resin-forming compound having a melting point of about 84–86° C., which is suitable for use in many applications, particularly as a component of phenolic resin compositions. The phenolic resins formed from trimethylolphenol alone or by reaction with polyhydroxy compositions are particularly desirable in that they can be prepared under aqueous polymerization techniques and are readily applied from aqueous solutions or dispersions. Aqueous solutions containing dissolved trimethylolphenol as well as a dissolved polyhydroxy compound as glycols, polyglycols, polysaccharides, and polyhydroxy resins such as polyvinyl alcohol and the like are particularly useful as sealers for porous boards and tiles. Curing of such resinous products is conveniently accomplished by the application of heat or the use of an acidic catalyst or both.

Homopolymers of trimethylolphenol can also be prepared under conditions similar to the preparation of the polyhydroxy-trimethylolphenol condensates. Because of the water solubility of the trimethylolphenol, the homopolymers can be produced under aqueous polymerization techniques. Such homopolymers are useful by virtue of their properties, particularly their application from aqueous solutions and the insolubility and infusibility of the homopolymer after curing. Concentrated aqueous solutions of trimethylolphenol have been found to be useful in mineral wool and fiber bonding applications, and particularly as binders for glass fiber batts and mats. In addition they serve very efficiently as paper beater addition products and as first coat resins for the preparation of electrical-grade paper laminates.

One of the principal difficulties heretofore of obtaining trimethylolphenol in pure form has been its extreme ease of self-condensation and polymerization. Under even mildly acidic conditions the trimethylolphenol will self-condense and otherwise be unusable. Heretofore, preparation of the pure trimethylolphenol has been accomplished only through extended and expensive methods of preparation and adaptable only for the recovery of crystalline products.

Hunter, J. Appl. Chem. 1, 217 (1951), reports that he was able to secure trimethylolphenol by the reduction of acetoxytrimesic acid triethyl ester with lithium aluminum hydride. Freeman, J. Am. Chem. Soc., 74, 6257 (1952), was likewise able to secure trimethylolphenol by the neutralization of sodium trimethylolphenate with acetic acid in a dilute suspension in acetone. In this process Freeman reported a yield of trimethylolphenol of 71 percent but of an obviously impure product (M.P. 74–75° C.). In addition, Freeman notes that in his process the trimethylolphenol was not always recoverable in crystalline form, but was quite often secured only as a viscous oily product. In addition, he has found it impossible to further purify the trimethylolphenol without resinification. Martin, J. Am. Chem. Soc. 74, 3024 (1952), was able to secure a crystalline product believed to be nearly pure anhydrous trimethylolphenol (melting point 84° C.) starting with phenol and formaldehyde. A mixture of polymethylolphenols formed in the reaction of the phenol and formaldehyde were converted to the trimethyl silyl derivatives with trimethylchlorosilane, which subsequently were separated by fractional distillation and each fraction then hydrolyzed. From one fraction Martin was able to isolate crystalline trimethylolphenol having a melting point of 84° C. in an unspecified yield after a recrystallization from ethyl acetate.

It is obvious that such processes are entirely too cumbersome and expensive in preparing trimethylolphenol suitable for commercial use or to justify commercial exploitation. Heretofore, there has been no known method to economically produce usable solutions of trimethylolphenol other than by dissolving the crystalline trimethylolphenol in water.

In my copending application Ser. No. 640,351, filed February 15, 1597, now U.S. Patent No. 2,889,374, there is disclosed a method for securing aqueous 2,4,6-trimethylolphenol solutions by the carefully controlled acidification of calcium and barium 2,4,6-trimethylolphenate with certain acids and their anhydrides. In this procedure, the acidification must be controlled to a pH of between 5 and 8, carefully avoiding any excess or localized acidification. The water-insoluble salt formed must then be removed from the solution by centrifugation or filtration or other suitable means. With certain salts, however, and under certain acidification techniques, it is possible that a small portion of salt may be left in the trimethylolphenate solution because of slight solubilities of the salt formed or of colloidal particles which are not removed by filtration or centrifugation. Removal of such small amounts of impurities is not only expensive and time consuming, but can affect the purity of the resulting trimethylolphenate polymerizate.

It is therefore an object of the present invention to provide a process for the direct production of usable aqueous solutions of trimethylolphenol in high yields and excellent purity in an inexpensive and simplified process rather than trying to produce a crystalline trimethylolphenol which ultimately will be dissolved in water for aqueous polymerization techniques, and thus will avoid some of the difficulties encountered heretofore.

According to the present invention, I have now discovered an improved process for securing aqueous solutions of 2,4,6-trimethylolphenol which can be substantially free of resinous by-products and of alkali and alkaline earth metal salts. The process of this invention includes the steps of contacting an aqueous solution of an alkali or alkaline earth metal salt of 2,4,6-trimethylolphenol with a substantially water-insoluble cation exchanging material for a time sufficient to substantially neutralize the solution, preferably to a pH of between about 4 and 8, and thereafter separating the resulting solution from the cation exchanging material.

This process secures a directly polymerizable solution of 2,4,6-trimethylolphenol in high purity as well as in high yield, and subsequent purification of the trimethylolphenol is not necessary. In other methods wherein acids such as hydrochloric acid and the like are amployed, accidental excesses of acid or localized acidification during neutralization to a pH less than about 4 can initiate resinification of some of the trimethylolphenol formed. This prevents recovery of the trimethylolphenol solutions free of such contaminants.

However, with this new procedure and process, a permanent continuous system can be carried out whereby the neutralization and regeneration operations can be controlled and monitored by pH meters to make a fully automatic and easily operated process, to recover the trimethylolphenol solutions in purified form.

This process is operable with any of the alkali or alkaline earth metal salts of 2,4,6-trimethylolphenol. These salts, for example, the sodium, potassium, calcium, barium and strontium 2,4,6-trimethylolphenate compounds or mixtures thereof, are all equally adaptable to this process. The process is particularly advantageous when it is desired to employ the sodium salt since other possible methods cannot secure the aqueous trimethylolphenol solutions free of sodium by-product salts because of the high degree of water solubility of sodium by-product salts. Heretofore, it was necessary to work in substantially anhydrous systems in order to secure the trimethylolphenol free of alkali metal salts, and then dissolve the trimethylolphenol in water when aqueous solutions were desired.

However, since water serves as a very convenient and inexpensive medium for the preparation of the alkali and alkaline earth metal salts of trimethylolphenol, a process which provides directly usable and directly polymerizable trimethylolphenol solutions free of such alkaline cations is highly desirable. The starting salts or aqueous solutions thereof can readily be obtained by known methods such as that of U.S. Patent 2,579,329, issued on December 18, 1951, to R. W. Martin, or by the method described in my copending application Serial No. 640,350, filed February 15, 1957, now U.S. Patent 2,889,373, issued June 2, 1959, or by other methods obvious to those skilled in the art. For best results, the trimethylolphenate salts should be substantially free of mono- and dimethylolphenate compounds and any resinous by-products which could foul or clog up the exchange resin or resin bed.

In my process, it is only necessary to have present enough water to form a fluid reaction solution. Preferably, it should be adjusted according to the concentration of trimethylolphenol desired in the resultant solution, but should not be so viscous as to create difficulties in mixing with or passing through the cation exchange material. I have found solutions containing from about 25 to 50 percent by weight of the trimethylolphenate salts provide a desirable balance between fluidity of the solution and volume of solution to be handled. However, practically speaking, any true solution of the trimethylolphenol salt can be employed in this process. The resultant solution can be diluted with additional water or if desired, be concentrated under reduced pressures at temperatures not exceeding about 50° C.

In order to effectively operate this process, it is necessary to employ a substantially water-insoluble cation exchanging material having an exchange potential for alkali and alkaline earth metal ions of the trimethylolphenate salts and which has an acid strength greater than that of the 2,4,6-trimethylolphenol. I prefer those materials which have an acid strength about or equivalent to most aliphatic carboxylic acids (such as acetic acid), and particularly those which have an exchange capacity of about 5 to 10 milliequivalents of the basic ion per gram of dry resin. The polycarboxylic acid type of cation exchanging resin is particularly preferred of this class. They are not so strongly acidic in nature to catalyze the resinification of the 2,4,6-trimethylolphenol formed, and are commercially available under various trade names; for example, Amberlite IRC-50, sold by the Rohm and Haas Co., is a resin of this preferred type.

It is not critical, however, that the cation exchanging groups of the ion exchanger be of any particular kind, nor is the ion exchange material limited to the synthetic cation exchanging resins, as long as the material has an acid strength greater than trimethylolphenol. For example, the polysulfonic acid and like types of resins, while more strongly acid in nature than the polycarboxylic acid types, can be employed. The very strong acidic resins such as the polysulfonic acid type are not as desirable for use in this invention as are the polycarboxylic acid type as they can cause a minor degree of resin by-products in the process, presumably through the self-resinification of the 2,4,6-trimethylolphenol produced and hence reduce the total yield of product in the recovered solution. Illustrative of some of the synthetic resins which can be employed are those set forth in Ion Exchange Resins, pages 89–96, 2nd ed. (1958), by R. Kunin, published by John Wiley & Sons, Inc., which is herewith incorporated by reference.

Likewise, the cation exchanging inorganic mineral materials, for instance zeolites, can be used. Zeolites are considered as the group of naturally occurring or synthetic hydrated metal aluminosilicates. These materials can be either amorphous or crystalline in structure; the synthetic type generally being of this latter group, particularly the materials marketed by the Linde Co. under the name "Microsieves." Most of these natural and synthetic zeolites are characterized by the formula

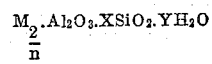

$$\frac{M_2}{n}.Al_2O_3.XSiO_2.YH_2O$$

wherein M is a basic cation (e.g., sodium, potassium, calcium, barium, etc.) having a valence $n$, and X and Y are integers, generally in the order of 1 to 7 for X and 1 to 10 for Y.

In the acid or hydrogen form, these zeolites serve as effective cation exchangers in this process as do the synthetic resinous ion exchangers. As the zeolites, and in fact some of the exchange resins, are often marketed in the salt or sodium form, they should be converted to acid or hydrogen form for use in this process. Generally this is easily performed on the synthetic resins by treatment with an acid followed by a water wash to remove the salts formed. The zeolites are, however, somewhat sensitive to acids so that acid wash is undesirable. They can, however, be easily converted to the acid form by replacing the sodium ion (or other basic metal ion in the zeolite) with ammonium ion and then heating the ammonium exchanged zeolite to an elevated temperature, such as about 350°–400° C., to liberate free ammonia. Because of this added regeneration step, the zeolites are not as desirable as the synthetic resins for use in carrying out this process in a continuous manner, but can nevertheless be employed if desired.

The cation exchange materials employed in this invention should be substantially insoluble in water and in other solvents to which the material would be exposed during normal service life. Insolubility of the synthetic resins is generally due to a high degree of cross-linking within the resin structure but can be influenced by other factors such as molecular weight and/or the degree of crystallinity in the polymer. Mineral ion exchange materials are inherently insoluble.

While it is necessary in this process to periodically regenerate the cation exchanging materials, since they are exchanging hydrogen ions for alkali or alkaline earth metal ions in the process, regeneration creates no great problems. Any acid can be used in the regeneration of the resin which is stronger than the exchange resin, and which will not degrade or otherwise injure the resin. Preferably, acids which form water-soluble salts with the alkali or alkaline earth metal cation are employed to facilitate the washing out of such salts and residue acid with water. However, acids forming solvent-soluble salts can also be employed and the salts and residue acids washed out with an appropriate solvent.

When sodium in the cation of the trimethylolphenate salt employed, practically any mineral acid can be employed for the regeneration because of the high degree of water solubility of sodium salts formed on regeneration. With calcium trimethylolphenate salts, hydrochloric and formic acids form water-soluble calcium salts and are desirable. Formic acid is particularly preferred with any of the alkali or alkaline earth metal salts as it easily regenerates the resins, forms water-soluble salts with all cations and will not cause resinification of any residual trimethylolphenol in the column. Care must be exercised when regenerating with strong mineral acids such as sulfuric and hydrochloric acid, since such acids can induce resinification of any residual trimethylolphenol in the exchange resins and tend to clog the column or coat the resin particles with resins. This would or could inactivate or impair their cation exchange potential. This is of course easily avoided by a water wash of the resin or resin bed prior to regeneration.

Regeneration of zeolites is accomplished by the conversion to the ammonium form followed by heating as hereinbefore set forth.

I prefer to operate the process of this invention at convenient (ambient) temperatures. Elevated temperatures are seldom desirable and may cause dimerization of the trimethylolphenol salt, or resinification of the trimethylolphenol formed, and do not hasten the cation exchange. Inasmuch as the reaction involved is a simple neutralization, there is no need for higher and lower temperatures than room temperature. This provides a fast, convenient reaction with little or no side reactions. For such reasons, temperatures below about 35°–50° C. are preferred.

It is not critical in the practice of this invention that a specific residence or contact time be maintained in this process. It is necessary, however, to assure a high purity 2,4,6-trimethylolphenate, that the solution after contact with the cation exchange resin be substantially neutralized, preferably to a pH between about 4 and 8. Aqueous trimethylolphenol alone has a pH of 5–6 which would indicate practical completion of neutralization in the process and is the best indicator that contact time is adequate. In a continuous process the pH of the effluent stream gradually increases when unconverted trimethylolphenate starts to leak through the column and then more rapidly increases as the exchange resin becomes saturated with the alkali or alkaline earth metal ions. At a pH about 6–8, regeneration can be indicated since any pH increase above that indicates that the exchange capacity of the resin bed is exhausted and some of the alkali or alkaline earth metal trimethylolphenate salts could be coming through the system. Prior to contact with the cation exchanging resin, the trimethylolphenol salt solution will have a pH greater than 11. However, in batch operation where there should be present sufficient cation exchanging groups to accept all the alkali or alkaline earth metal ions from the salt, this pH rise will not occur and no problems are created. In this case the pH should drop to a constant point between about 5 and 6.

Inasmuch as the pH of the solution can be affected by such factors as concentration of trimethylolphenol, amount of dissolved or absorbed material, particularly carbon dioxide, and like factors, it is desirable to employ other indicators to indicate when the solution has been substantially neutralized. Alkaline ion detectors and ash content of the trimethylolphenol solution can give an effective indication of the neutralization. Ash content should not be above 1.0 percent by weight of the solution and preferably should be less. Thus, operation of the process even at a pH of about 8 can be controlled to prevent the passage of too much of the trimethylolphenate salt through the exchange resin by maintaining the ash content less than 1.0 percent, or by chemical tests which indicate the presence of the alkaline ions.

When calcium trimethylolphenate is used, another effective detector indicating completion of the neutralization is a 5 percent aqueous solution of $Na_2CO_3$. A completely neutralized effluent will form a clear green solution in the presence of a few drops of the $Na_2CO_3$ solution but forms a white precipitate or a distinct opalescence in the presence of any calcium ion.

The process of this invention can be carried out in either batch, semi-continuous or in continuous operation. Because of ease of control and determination of complete exchange on the resin, it is particularly adaptable to continuous process even under complete automation by the use of controller systems. In the continuous operation, two or more columns are generally necessary with one column being regenerated while the other is operating. As the operating column becomes exhausted, the flow of trimethylolphenol salt solution is switched to the regenerated column without interruption of flow, and the regeneration started with the column removed from use.

I prefer to operate with a conventionally packed bed of resin in a suitable elongated column. Operating with the aqueous trimethylolphenol salt solution intermittently flowing upwardly through the column prevents channeling of the liquid through the column. However, downward flow is equally satisfactory providing other measures are taken to prevent channeling.

The following examples are illustrative.

EXAMPLE I

*Aqueous trimethylolphenol column method using IR–112 exchange resin and sodium trimethylolphenate*

A column ⅞″ in diameter and 48″ high was packed with Amberlite IR–112 cation exchange resin having an exchange capacity of about 5 milliequivalents per gram of dry resin. A solution of 61.8 g. (.3 mole) of sodium trimethylolphenate in 100 ml. of water was passed through the column, followed by water washings totaling one liter. The combined effluents were of pH about 4 and gave a positive $FeCl_3$ test, indicating the presence of a free phenolic system. Phenate salts fail to give the usual coloration with $FeCl_3$ and their pH is well above 8, thus indicating substantial freedom from sodium 2,4,6-trimethylolphenate and other alkaline salts. The recovered trimethylolphenol solution was of excellent purity.

EXAMPLE II

*Aqueous trimethylolphenol batch method using IRC–50 exchange resin and calcium trimethylolphenate*

A mixture of 10 g. (.05 mole) of calcium trimethylolphenate in 15 ml. of water and 20 g. of commercial Amberlite IRC–50 (having an exchnage capacity of about 5 milliequivalents per gram of resin and containing about 50 percent adsorbed water) was agitated for 45 minutes, at the end of which time the pH was 5–6. The solution was isolated by filtration and combined with two subsequent 10-ml. water washings of the exchange resin which was sucked dry each time with a rubber dam via vacuum filtration. The combined filtrates were light amber in color, and of high purity of 2,4,6-trimethylolphenol.

A qualitative analysis of this aqueous trimethylolphenol consisted in its transformation to the sodium salt (made to pH 9 with sodium hydroxide). The salt was precipitated by the addition of acetone and was filtered and dried in vacuo. The neutralization equivalent of this salt was determined as 220. When prepared directly (from phenol and formaldehyde), the sodium salt is isolated as the monohydrate, neutralization equivalent 224. This confirmed the presence and substantial purity of the trimethylolphenol formed via the ion exchange method, since a high neutralization equivalency indicates the absence of lower methylolated phenols which would substantially lower the neutralization equivalent.

The amount of trimethylolphenol present was determined by the addition to its solution of an excess of C.P. sodium hydroxide to a pH greater than 10 and quantitatively precipitating the formed sodium trimethylolphenate-sodium hydroxide by the addition of acetone. The following equation was derived and used to derive the yield:

$$Y = 1.03W\left(\frac{N-40}{N}\right)$$

where:

$Y$ = weight of trimethylolphenol in sample solution
$W$ = weight of precipitate
$N$ = neut. equiv. of this precipitate In this example, Y was determined on an aliquot amount of the total solution and total Y calculated to be 8.03 g. or 87% yield of trimethylolphenol.

I claim:

1. A process for the preparation of solutions of 2,4,6-trimethylolphenol which includes the steps of contacting an aqueous solution of a member of the group consisting of alkali and alkaline earth metal salts of 2,4,6-trimethylolphenol with a substantially water-insoluble cation exchanging material having an acid strength greater than 2,4,6-trimethylolphenol for a time sufficient to remove substantially all of the metal cation of the said member from the said solution and thereafter separating the resulting solution from the said cation exchanging material.

2. A process according to claim 1 wherein the pH of the resulting solution is between 4 and 8.

3. A process according to claim 1 wherein the cation exchanging material is a synthetic resinous material containing acidic groups bound thereto.

4. A process according to claim 3 wherein the acidic groups are carboxylic acid groups.

5. A process for the preparation of directly polymerizable aqueous solutions of 2,4,6-trimethylolphenol from a solution of water and a member of the group consisting of alkali and alkaline earth metal salts of 2,4,6-trimethylolphenol which includes the steps of contacting the solution containing said salt with a substantially water insoluble cation exchanging synthetic resin having an acid strength greater than 2,4,6-trimethylolphenol for a time sufficient to neutralize the said solution to a pH between 4 and 8 and thereafter separating the resulting solution from the said synthetic resin.

6. A process according to claim 5 wherein the synthetic resin contains carboxylic acid groups as the principal cation exchanging groups.

7. A process according to claim 5 wherein the said salt of 2,4,6-trimethylolphenol is sodium 2,4,6-trimethylolphenate.

8. A process according to claim 5 wherein the said salt of 2,4,6-trimethylolphenol in calcium 2,4,6-trimethylolphenate.

9. A continuous process for the preparation of aqueous solutions of 2,4,6-trimethylolphenol which comprises passing a solution of water and a member of the group consisting of alkali and alkaline earth metal salts of 2,4,6-trimethylolphenol through an enclosed chamber containing a substantially water-insoluble cation exchanging material having an acid strength greater than 2,4,6-trimethylolphenol at a rate such that the effluent solution is substantially free of the metal cation of the said member.

10. A process according to claim 9 wherein the cation exchanging material is a synthetic resinous material containing acidic groups bound thereto.

11. A process according to claim 10 wherein the acidic groups are carboxylic acid groups.

12. A process according to claim 11 wherein the said salt of 2,4,6-trimethylolphenol is sodium 2,4,6-trimethylolphenate.

13. A process according to claim 11 wherein the said salt of 2,4,6-trimethylolphenol is calcium 2,4,6-trimethylolphenate.

References Cited in the file of this patent

Kunin et al.: "Ion Exchange Resins," pages 26–30 (5 pages), published by John Wiley and Sons, New York (1950).

Martin: Jour. Amer. Chem. Soc., vol. 73 (1951), pages 2952–53 (4 pages).

Freeman: Jour. Amer. Chem. Soc., vol. 74 (1952), pages 6257–60 (4 pages).